Sept. 8, 1942.　　　E. D. PELLEGRIN ET AL　　　2,295,268
COMBINATION LIGHT FIXTURE AND MIRROR
Filed Sept. 30, 1940　　　2 Sheets-Sheet 1
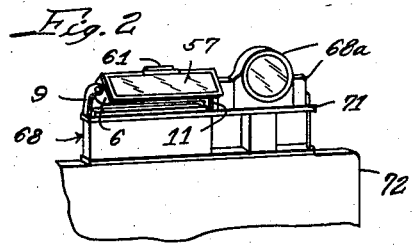
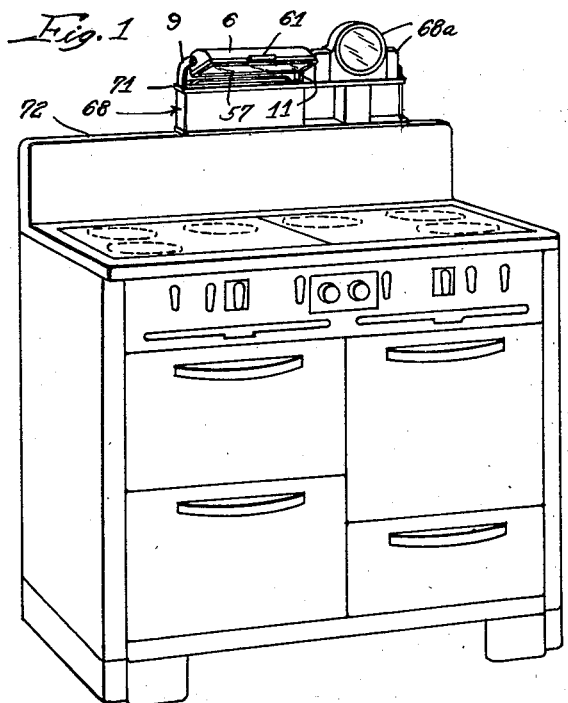
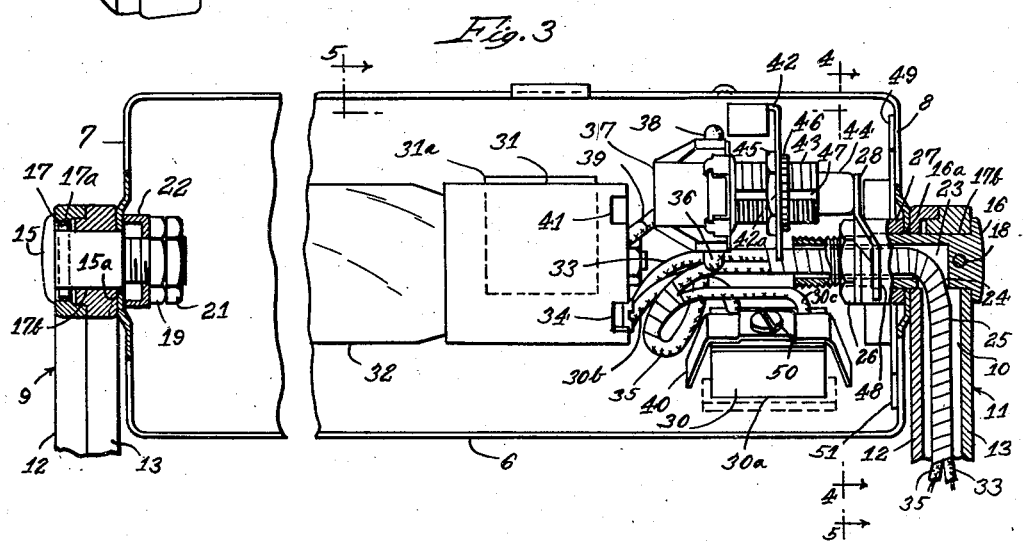
Inventors:
Elmer D. Pellegrin
& Harold H. Ring
By McCanna, Wintercorn & Morebach
Attys.

Sept. 8, 1942.   E. D. PELLEGRIN ET AL   2,295,268
COMBINATION LIGHT FIXTURE AND MIRROR
Filed Sept. 30, 1940   2 Sheets-Sheet 2
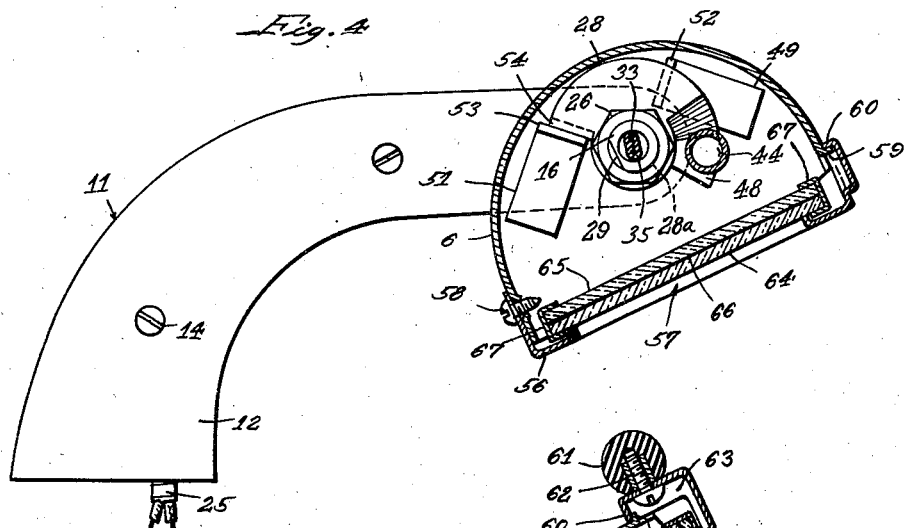
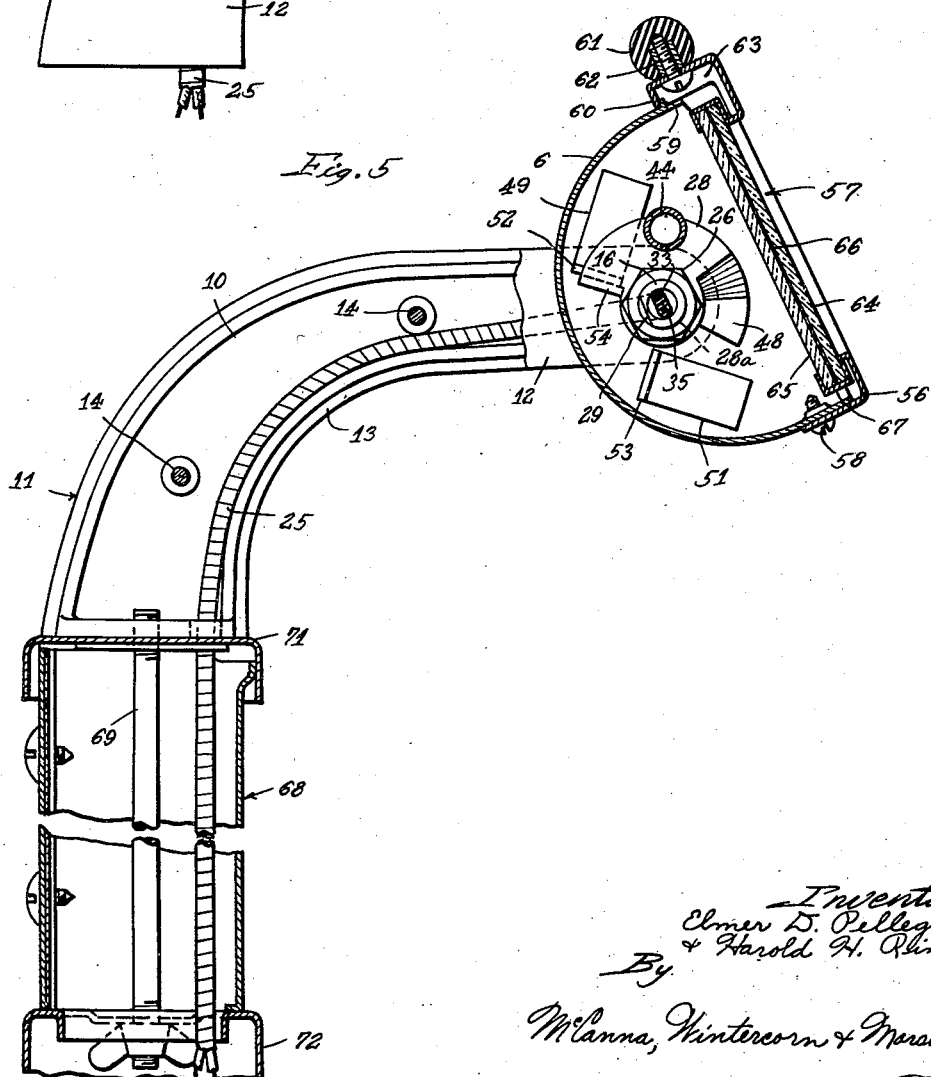

Patented Sept. 8, 1942

2,295,268

UNITED STATES PATENT OFFICE 2,295,268

COMBINATION LIGHT FIXTURE AND MIRROR

Elmer D. Pellegrin and Harold H. Ring, Rockford, Ill., assignors to Geo. D. Roper Corporation, Rockford, Ill., a corporation of Illinois Application September 30, 1940, Serial No. 359,022

2 Claims. (Cl. 240—2)

This invention relates to a combination electrical lighting fixture and mirror.

The principal object of my invention is to provide an attractive easily adjustable fixture suitable for use in a cooking range, kitchen cabinet or other piece of furniture, the fixture being adapted, when adjusted so that the casing thereof is directed downwardly, to illuminate electrically a space therebeneath such as the cooking top of a range, and, when adjusted so that the casing thereof is directed forwardly or upwardly, to serve as a convenient mirror.

Another object of my invention is to provide a device of the character described including means for automatically closing an electrical circuit for the light bulb only when the casing is turned to the position for illumination of the space therebeneath.

Though the invention is herein described with particular reference to use on a cooking range, it is not to be considered as limited to such use; it may also be applied to other furniture and wherever illumination is required intermittently for reading or other purposes and where a mirror is also a convenience when the light is not in use.

The invention is illustrated in the accompanying drawings, wherein—

Fig. 1 is a perspective view showing the mirror-light fixture mounted on the back rail portion of a cooking range, the casing being directed downwardly for the illumination of the cooking top;

Fig. 2 is a perspective view showing the mirror-light fixture directed upwardly so as to serve as a mirror;

Fig. 3 is a front elevation of the fixture casing with the glass closure and bezel removed, portions of the casing and bulb being broken away to permit illustration on a larger scale and portions of the supporting brackets being sectioned to show how they are attached to the casing;

Fig. 4 is a transverse section on the line 4—4 of Fig. 3, including the bezel and glass and showing the casing directed downwardly as in Fig. 1, and Fig. 5 is a transverse section on the broken line 5—5 of Fig. 3, including the bezel, glass and handle knob, the view showing the casing directed upwardly as in Fig. 2, and showing also details of the mounting on the back rail.

The same reference numerals are applied to corresponding parts in these five views.

A light casing 6 of stamped sheet metal that is of an elongated, generally semi-cylindrical shape and has integral end walls 7 and 8 is supported at its ends on brackets 9 and 11. The brackets 9 and 11, which are substantially identical, each consists of two pieces 12 and 13 having recessed inner surfaces to provide a passage 10 therebetween when the pieces are secured together by screws 14.

The casing 6 is mounted on the upper ends of the brackets 9 and 11 on studs 15 and 16 as at 15a and 16a and is adapted to turn thereon on a horizontal longitudinal axis. The studs 15 and 16 are detachably secured against turning in the brackets 9 and 11 by pins 17 and 18 whose ends are entered in keyways 17a in the holes 17b through which the studs are entered. The stud 15 is secured to the shell 6 by a nut 19 and lock nut 21, the nut 19 being next to a collar 22 which frictionally engages the inside of the end wall 7 of the casing 6 to hold the latter in place while permitting turning thereof.

The stud 16 is hollow, as shown at 23, and has a slot 24 in its shank portion through which a cable 25, that extends through passage 10 in bracket 11, is entered. A nut 26 on the threaded end of the stud 16 holds in place another collar 27 like the collar 22, together with a segmental cam plate 28. The cam plate 28 has an irregular shaped hole 28a therein so as to fit nonrotatably on the stud 16, which has a flat 29 provided thereon, as shown in Figs. 4 and 5. It is clear, therefore, that the casing 6 is free to turn relative to the cam plate 28.

A socket 31 that supports an electric light bulb 32 is suitably secured, as indicated at 31a, within the casing 6. One electrical conductor 33 in the cable 25 goes directly to one terminal 34 of the socket 31 while the other conductor 35 goes to one terminal 36 on a switch 37, which has another terminal 38 from which a conductor 39 connects with the socket 31 at terminal 41. It is evident, therefore, that the switch 37 controls the electric circuit for the socket 31.

A conventional attachment plug receptacle 30 for electrical appliances having an enlarged end portion that projects outside an opening 30a in the casing 6 is fastened rigidly by a clamp 40 and screw 50 so as to draw the enlarged portion of the plug inwardly against the outside of the casing 6. Conductors 30b and 30c connected to conductors 33 and 35 are connected to the plug receptacle 30 to furnish a continuous source of electric current therefor, independently of the switch 37, so that the housewife has available an extra receptacle for an electric food mixer, electric fan, electric sad-iron, curling iron, or other electrical appliance.

As is clear from Fig. 3, the switch 37 is mounted on a bracket 42 welded to the inside of the casing 6. A threaded mounting sleeve 43 on the rear portion of the switch and containing a spring-pressed plunger 44 provides an endwise adjustable means for adjustably mounting the switch 37 relative to the cam plate 28. The sleeve 43 is locked to the bracket 42 by opposed nuts 45 and 46, the bracket having a lug 42a which engages in a longitudinal groove 47 in the sleeve 43 to prevent its turning. It is evident that adjustment of the opposed nuts 45 and 46 on the sleeve 43 permits endwise adjustment of the switch with respect to the bracket 42 to secure the desired spacing of the switch 37 from the cam plate 28. The circuit through the switch 37 is broken when the plunger 44 is depressed, and vice versa. As illustrated in Figs. 4 and 5, the cam plate 28 is so positioned on the stud 16 that its outwardly bent or offset end portion 48 permits the plunger 44 to move outwardly to closed circuit position only when the casing is directed downwardly. When the casing is directed upwardly, the plunger is depressed, thereby opening the circuit to the bulb 32. The bulb 32, therefore, is lighted only when the casing 6 is turned to the downwardly directed position of Figs. 1 and 4.

Stops 49 and 51 having inwardly extending right angled end portions 52 and 53 are welded in place on the end wall 8 of the casing 6 to limit rotary movement of the casing in both directions by engagement with opposite sides of an outwardly bent lug 54 on the cam plate 28.

A bezel or frame 56 containing a glass closure 57 is fastened onto the open front of the casing 6 by screws 58 on one side, and on the opposite side by the engagement of outwardly bent ears 59 on the casing with a flange 60 on the frame. A plastic handle knob 61 of cylindrical shape is secured to the middle portion of one side of the frame 56 by screws 62. Insulating material 63 is packed at this center portion to shield the knob from the heat of the bulb 32 and prevent the knob from becoming too warm through long use of the device in the lighting position.

The glass closure 57 is composed of two plates of glass 64 and 65 placed back to back with a layer of mirror silver 66 therebetween, thereby protecting the silver layer from any scratching incident to handling. The glass plates 64 and 65 are secured within the frame 56 by U-shaped clips 67. The silvered glass closure 57 permits light from the bulb 32 to pass therethrough for illuminating purposes but otherwise functions as any other mirror when the bulb is not lighted, besides concealing from view the bulb and its accessory equipment.

As shown in Fig. 5, the device is fastened to the support 68 for the timer and condiment set, shown at 68a in Figs. 1 and 2. Bolts 69 are entered in threaded holes in the brackets 9 and 11 from the bottom of the support 68. The support 68 includes a flanged cover 71 and is secured to the back rail 72 of the cooking range by the bolts 69, as appears in Fig. 5.

In operation, if illumination of the cooking top is desired, the operator grasps the knob 61 and turns the casing 6 so as to direct it downwardly as in Figs. 1 and 4. In this position, the cam plate 28 permits the plunger 44 to move out to its outer limit, thereby closing the circuit through the switch 37 and lighting the bulb 32. To shut off the light and position the casing 6 with the glass closure 57 for use as a mirror, the operator turns the casing so as to direct it upwardly to the position illustrated in Figs. 2 and 5. In this position, the cam 28 holds the plunger 44 depressed within the sleeve 43 and accordingly breaks the circuit for the bulb 32. A broad range of adjustment of the casing is possible in its upwardly directed position, for use as a mirror, without lighting the bulb 32. The stops 49 and 51 limit the rotary adjustment to approximately 90° in only the first acute angle portion of which the bulb is lighted.

It is believed the foregoing description conveys a good understanding of the objects and advantages of our invention. The appended claims have been drawn with a view to covering all legitimate modifications and adaptations.

We claim:

1. An adjustable electric light fixture for use on the back rail of a domestic cooking range over the cooking top thereof, comprising, in combination, supporting means supported on the back rail, a light bulb casing pivoted thereon at an elevation near the eye level of an operator for adjustment relative to the cooking top to be illuminated, a transparent mirror forming a closure for the open front of the casing, a socket in said casing containing an electric light bulb, electrical conductors adapted to be connected with a source of electric current supply for supplying current to said socket to light the bulk, and switch means interposed in the electrical circuit including said conductors and arranged to be opened and closed automatically at predetermined points in the pivotal adjustment of said casing, so that when the casing is swung downwardly to face the cooking top the light is turned on automatically for illumination thereof, and when the casing is swung upwardly to face the front of the range the light is automatically turned off so as not to interfere with use of the mirror.

2. A fixture as set forth in claim 1, including an electrical attachment plug-receptacle on said casing, electrically connected with the conductors for said switch and receptacle, so as to be in continuous closed circuit relation to the source of electric current supply independently of the switch.

ELMER D. PELLEGRIN.
HAROLD H. RING.